(12) United States Patent
Fujita et al.

(10) Patent No.: US 10,145,488 B2
(45) Date of Patent: Dec. 4, 2018

(54) SOLENOID VALVE

(71) Applicant: JTEKT CORPORATION, Osaka-shi (JP)

(72) Inventors: Kaori Fujita, Kariya (JP); Toshio Murakami, Nagoya (JP)

(73) Assignee: JTEKT CORPORATION, Osaka-shi (JP)

(*) Notice: Subject to any disclaimer, the term of this patent is extended or adjusted under 35 U.S.C. 154(b) by 7 days.

(21) Appl. No.: 15/291,638

(22) Filed: Oct. 12, 2016

(65) Prior Publication Data
US 2017/0108138 A1    Apr. 20, 2017

(30) Foreign Application Priority Data
Oct. 15, 2015    (JP) ................ 2015-203662

(51) Int. Cl.
*F16K 31/06* (2006.01)
*F16K 11/07* (2006.01)
*F16K 27/04* (2006.01)
*H01F 7/16* (2006.01)
*H01F 7/121* (2006.01)

(52) U.S. Cl.
CPC .......... *F16K 31/0675* (2013.01); *F16K 11/07* (2013.01); *F16K 11/0716* (2013.01); *F16K 27/041* (2013.01); *F16K 27/048* (2013.01); *F16K 31/0613* (2013.01); *H01F 7/121* (2013.01); *H01F 7/1607* (2013.01)

(58) Field of Classification Search
CPC ............. F16K 31/0675; F16K 31/0613; F16K 11/0716; F16K 27/048; H01F 7/121; H01F 7/1607

USPC ................ 137/625.69; 251/129.15
See application file for complete search history.

(56) References Cited

U.S. PATENT DOCUMENTS

| | | | | |
|---|---|---|---|---|
| 6,547,215 B2 * | 4/2003 | Matsusaka | .......... | F16K 31/0613 137/375 |
| 8,134,436 B2 * | 3/2012 | Yasoshima | .............. | H01F 7/127 251/129.15 |
| 8,418,724 B2 * | 4/2013 | Suzuki | ................ | F15B 13/0402 137/625.64 |
| 8,556,232 B2 * | 10/2013 | Oikawa | ............... | F16K 31/0613 251/129.01 |
| 8,800,399 B2 * | 8/2014 | Mills | ................... | F16H 61/0251 137/118.02 |

(Continued)

FOREIGN PATENT DOCUMENTS

JP    2014-185748    10/2014

*Primary Examiner* — Ian Paquette
(74) *Attorney, Agent, or Firm* — Oblon, McClelland, Maier & Neustadt, L.L.P.

(57) ABSTRACT

A solenoid valve includes a sleeve, a spool valve, and a solenoid part. The solenoid part has an electromagnetic coil, a solenoid core, a plunger that moves in the axial direction with respect to the solenoid core, and a stopper that is interposed between the plunger and the solenoid core to restrict movement of the plunger. The solenoid core includes a cylindrical part and an extended part. The cylindrical part has an opposing surface facing the plunger in the axial direction and a contact surface that is contacted by the stopper. The extended part is extended in the axial direction from an outer peripheral end of the cylindrical part. At least a part of the opposing surface of the cylindrical part is located closer to the plunger than the contact surface.

2 Claims, 6 Drawing Sheets

(56) References Cited

U.S. PATENT DOCUMENTS 9,163,745 B2 * 10/2015 Murakami .............. F16K 31/06
2015/0247585 A1 * 9/2015 Takanishi ............ F16K 31/0613
251/129.15

* cited by examiner

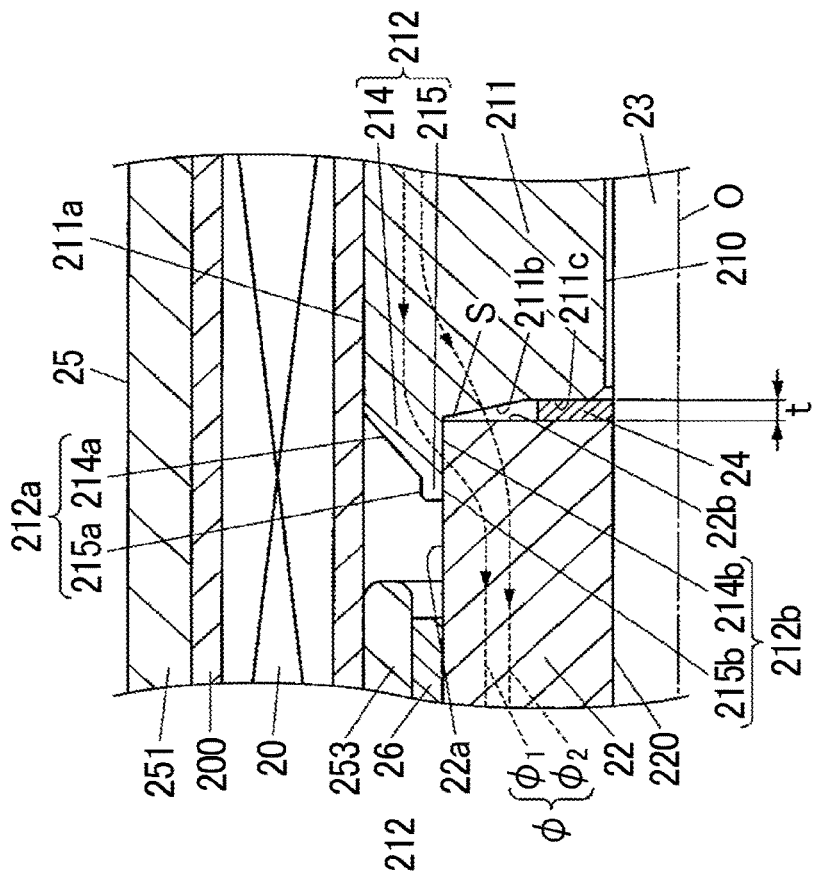
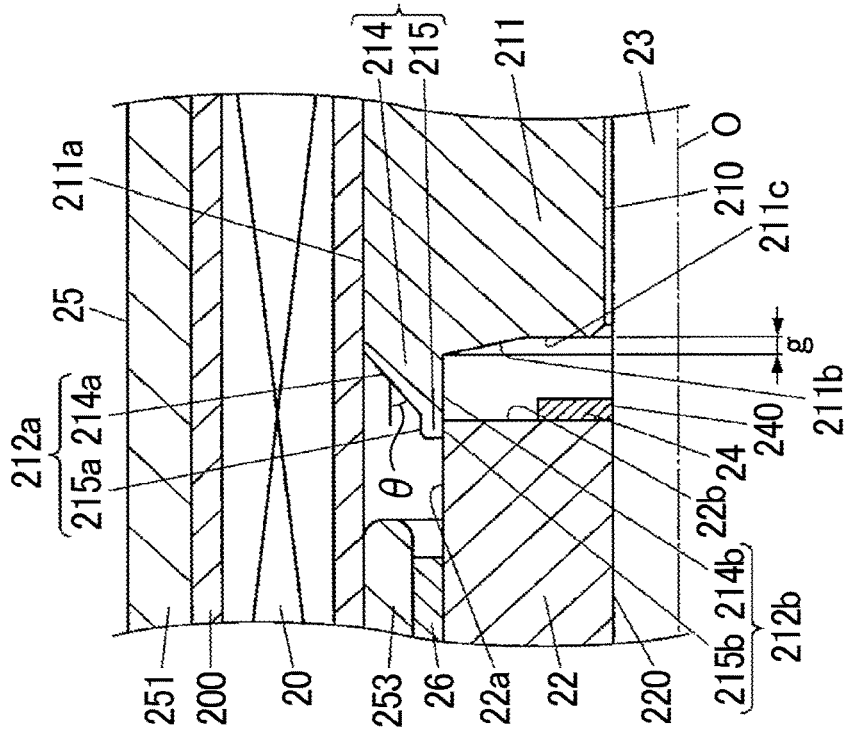

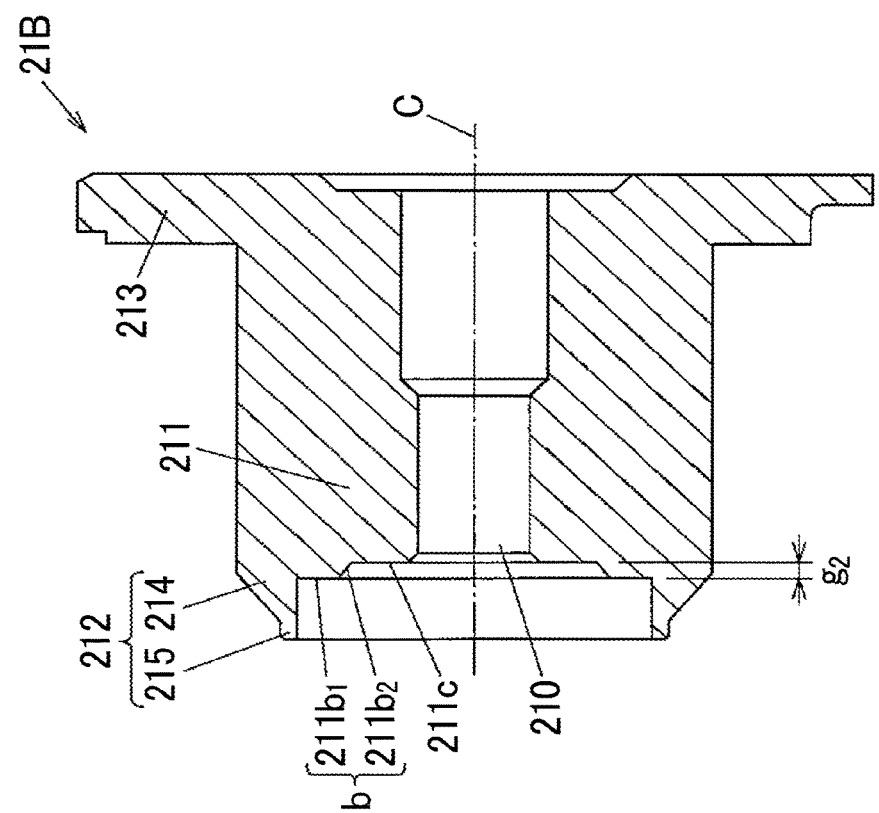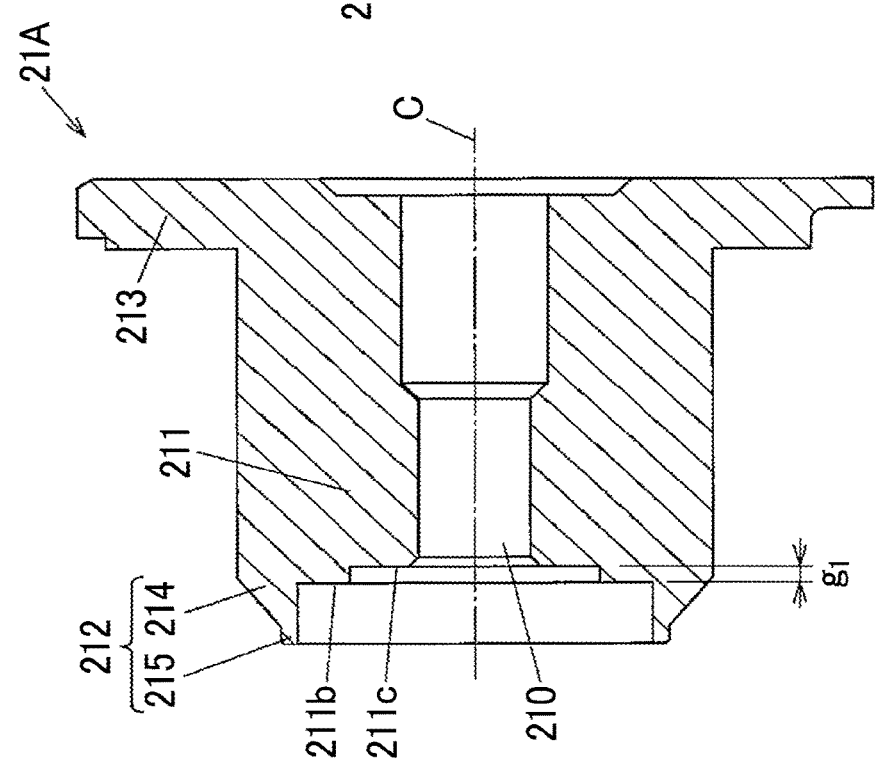

(CONVENTIONAL EXAMPLE)

(CONVENTIONAL EXAMPLE)

SOLENOID VALVE

INCORPORATION BY REFERENCE

The disclosure of Japanese Patent Application No. 2015-203662 filed on Oct. 15, 2015 including the specification, drawings and abstract, is incorporated herein by reference in its entirety.

BACKGROUND OF THE INVENTION

1. Field of the Invention

The present invention relates to solenoid valves including a solenoid part that moves a spool valve in the axial direction with respect to a tubular sleeve having a supply port and an output port.

2. Description of the Related Art

Conventionally, a solenoid valve including a tubular sleeve, a spool valve, and a solenoid part is used to control, e.g., a hydraulic device of an automatic transmission of a vehicle (see, e.g., Japanese Patent Application Publication No. 2014-185748 (JP 2014-185748 A)). The tubular sleeve has a supply port to which hydraulic oil is supplied and an output port that outputs hydraulic oil. The spool valve moves in the axial direction in a valve hole formed in the sleeve to change the area of a flow path between the supply port and the output port. The solenoid part operates when an exciting current is supplied thereto, and presses the spool valve toward one side in the axial direction.

The solenoid part of the solenoid valve described in JP 2014-185748 A has an electromagnetic coil, a solenoid core, a plunger, a shaft, and an annular stopper. The solenoid core serves as a magnetic path for magnetic flux generated by the electromagnetic coil. The plunger moves in the axial direction with respect to the solenoid core. The shaft moves with the plunger in the axial direction. The annular stopper is fitted on the shaft. When an exciting current is supplied to the electromagnetic coil, the plunger moves in the axial direction with respect to the solenoid core, so that the shaft presses the spool valve.

FIG. 6A is a configuration diagram showing an example of the configuration of a solenoid part of a conventional solenoid valve 9. FIG. 6B is a partial enlarged view of FIG. 6A. In FIG. 6A, the portion above an axis O shows the solenoid valve 9 in a non-operating state (no exciting current being applied to an electromagnetic coil 90), and the portion below the axis O shows the solenoid valve 9 in an operating state with an exciting current having a rated current value being applied to the electromagnetic coil 90 of the solenoid valve 9.

As shown in FIGS. 6A and 6B, the solenoid part of the solenoid valve 9 is configured so that a plunger 92 moves in the axial direction with respect to a solenoid core 91 by the magnetic force of the electromagnetic coil 90. The electromagnetic coil 90, the solenoid core 91, and the plunger 92 are accommodated in a solenoid case 900.

The solenoid core 91 has a cylindrical part 911, an annular extended part 912, and an annular plate-shaped rib part 913. A shaft 93 that moves with the plunger 92 in the axial direction is inserted through the center of the cylindrical part 911. The extended part 912 is extended in the axial direction from an outer peripheral end of one end of the cylindrical part 911 toward the plunger 92. The rib part 913 projects outward from the other end of the cylindrical part 911. The extended part 912 is formed by a tapered part 914 and an annular extending part 915. The tapered part 914 is formed such that the outside diameter thereof decreases further away from the cylindrical part 911. The extending part 915 extends in the axial direction from a tip end of the tapered part 914.

As shown in the expanded view of FIG. 6B, an outer peripheral surface 914a of the tapered part 914 has a conical shape whose outside diameter decreases closer to the extending part 915. An outer peripheral surface 915a of the extending part 915 has a cylindrical shape whose outside diameter is the same as a part of the outer peripheral surface 914a of the tapered part 914, which has the smallest diameter. An inner peripheral surface 912a of the extended part 912 has the same bore diameter along the entire axial length of the tapered part 914 and the extending part 915 and faces an outer peripheral surface 92a of the plunger 92.

An annular stopper 94 is interposed between the cylindrical part 911 of the solenoid core 91 and the plunger 92. The stopper 94 is made of a nonmagnetic material and is fitted on the shaft 93. As the plunger 92 approaches the solenoid core 91 (the cylindrical part 911), the stopper 94 is sandwiched between the cylindrical part 911 of the solenoid core 91 and the plunger 92, whereby axial movement of the plunger 92 toward the solenoid core 91 is restricted. The stopper 94 prevents the plunger 92 from not being separated from the solenoid core 91 due to the residual magnetism in the solenoid core 91 and the plunger 92.

When an exciting current is supplied to the electromagnetic coil 90, the plunger 92 is moved toward the cylindrical part 911 with respect to the solenoid core 91 by the magnetic force of the electromagnetic coil 90. The shaft 93 moves with the plunger 92 to move a spool valve 95 with respect to a sleeve 96. If supply of the exciting current to the electromagnetic coil 90 is cut off, the spool valve 95 is moved toward the solenoid part by the restoring force of a spring, not shown, and the plunger 92 is separated from the cylindrical part 911 of the solenoid core 91.

In order to accurately control the solenoid valve 9 configured as described above, it is desirable that an axial force that is applied to the plunger 92 (attraction toward the solenoid core 91) vary only slightly even if the axial position of the plunger 92 with respect to the solenoid core 91 changes when a fixed exciting current is supplied to the electromagnetic coil 90. It is also desirable in terms of power saving and reduction in size of the solenoid valve that the plunger 92 be subjected to a larger axial force for the exciting current that is supplied to the electromagnetic coil 90. Typically, the axial force that is applied to the plunger 92 when a fixed exciting current is supplied to the electromagnetic coil 90 tends to increase in the central part of a movable range of the plunger 92 relative to the solenoid core 91, or a range in which the plunger 92 can move relative to the solenoid core 91, and tends to decrease at both ends of the movable range.

In order to increase the axial force that is applied to the plunger 92 when the plunger 92 is located farthest from the cylindrical part 911 of the solenoid core 91 in the solenoid valve 9, it is effective to increase the radial thickness of the extending part 915 of the extended part 912 and to increase the tilt angle θ of the outer peripheral surface 914a of the tapered part 914 with respect to the axial direction, as shown by phantom line (long dashed double-short dashed line) in FIG. 6B. However, changing the shape of the extended part 912 in this manner causes a disadvantageous phenomenon. Namely, when the plunger 92 approaches the cylindrical part 911 of the solenoid core 91, a radial component of the magnetic force that is applied to the plunger 92 increases and an axial component (the axial force described above) of this magnetic force decreases.

SUMMARY OF THE INVENTION

It is one object of the present invention is to provide a solenoid valve that can restrain reduction in axial force that is applied to a plunger when the plunger is located at an end of a movable range of the plunger relative to a solenoid core, or a range in which the plunger can move relative to the solenoid core, and which can restrain variation in axial force according to the axial position of the plunger.

According to one aspect of the present invention, a solenoid valve includes: a tubular sleeve having a supply port to which hydraulic oil is supplied and an output port that outputs hydraulic oil; a spool valve that is accommodated in a valve hole formed in the sleeve such that the spool valve is movable in an axial direction in the valve hole, and that changes an area of a flow path between the supply port and the output port by axial movement of the spool valve; a solenoid part that operates when an exciting current is supplied thereto and that presses the spool valve toward one side in the axial direction with a pressing force according to magnitude of the exciting current; and a biasing member that biases the spool valve toward the solenoid part. The solenoid part includes an electromagnetic coil that generates magnetic flux by the exciting current, a fixed core that is held stationary with respect to the sleeve and that serves as a magnetic path for the magnetic flux, a cylindrical plunger that moves in the axial direction with respect to the fixed core when subjected to the magnetic flux, a shaft that moves with the plunger in the axial direction and presses the spool valve, and a restricting member that is made of a nonmagnetic material and that is fitted on the shaft and is interposed between the plunger and the fixed core to restrict the axial movement of the plunger. The fixed core includes a cylindrical part that has an insertion hole formed through a center thereof so that the shaft is inserted through the insertion hole, and that has an opposing surface facing the plunger in the axial direction and a contact surface that is contacted by the restricting member, and an annular extended part that is extended in the axial direction from an outer peripheral end of the cylindrical part toward the plunger. At least a part of the extended part is tapered such that an outside diameter of at least a part of an outer peripheral surface of the extended part decreases closer to a tip end of the extended part. An inner peripheral surface of the extended part faces an outer peripheral surface of the plunger. At least a part of the opposing surface of the cylindrical part is located closer to the plunger than the contact surface.

The solenoid valve according to the present invention can restrain reduction in axial force that is applied to the plunger when the plunger is located at an end of a movable range of the plunger relative to a solenoid core, and which can restrain variation in axial force according to the axial position of the plunger.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2A is an enlarged view of a solenoid part of the solenoid valve in a non-operating state;

FIG. 2B is an enlarged view of the solenoid part of the solenoid valve in an operating state;

FIG. 5A is a sectional view showing a modification in which the solenoid core has a modified shape;

FIG. 5B is a sectional view showing another modification in which the solenoid core has a modified shape;

DETAILED DESCRIPTION OF EMBODIMENTS

Solenoid valves according to embodiments of the present invention will be described in detail with reference to the accompanying drawings.

Figure 1:
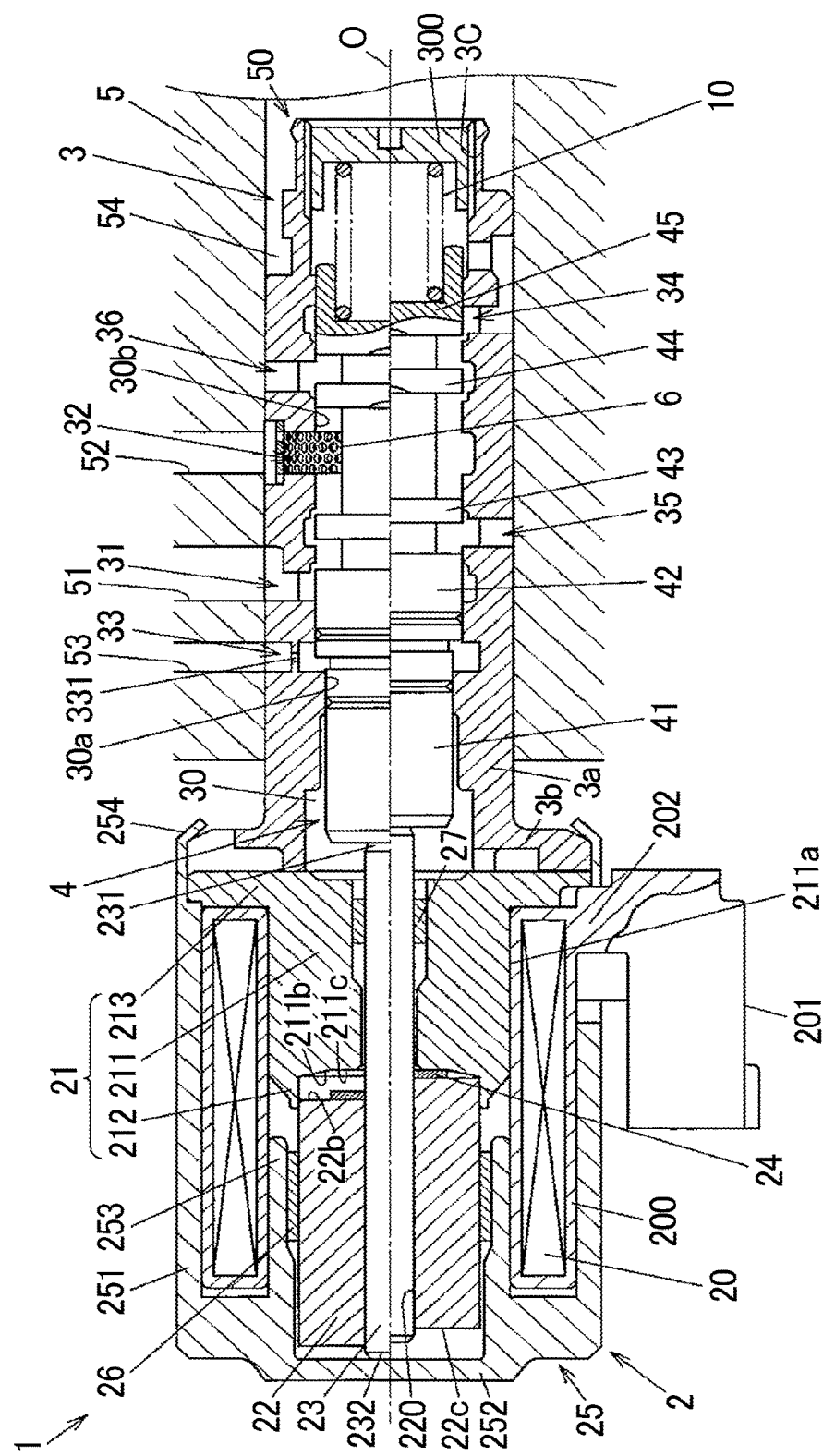
FIG. 1 is a sectional view showing, together with a valve body, the configuration of a solenoid valve according to an embodiment of the present invention.
Figure 3:
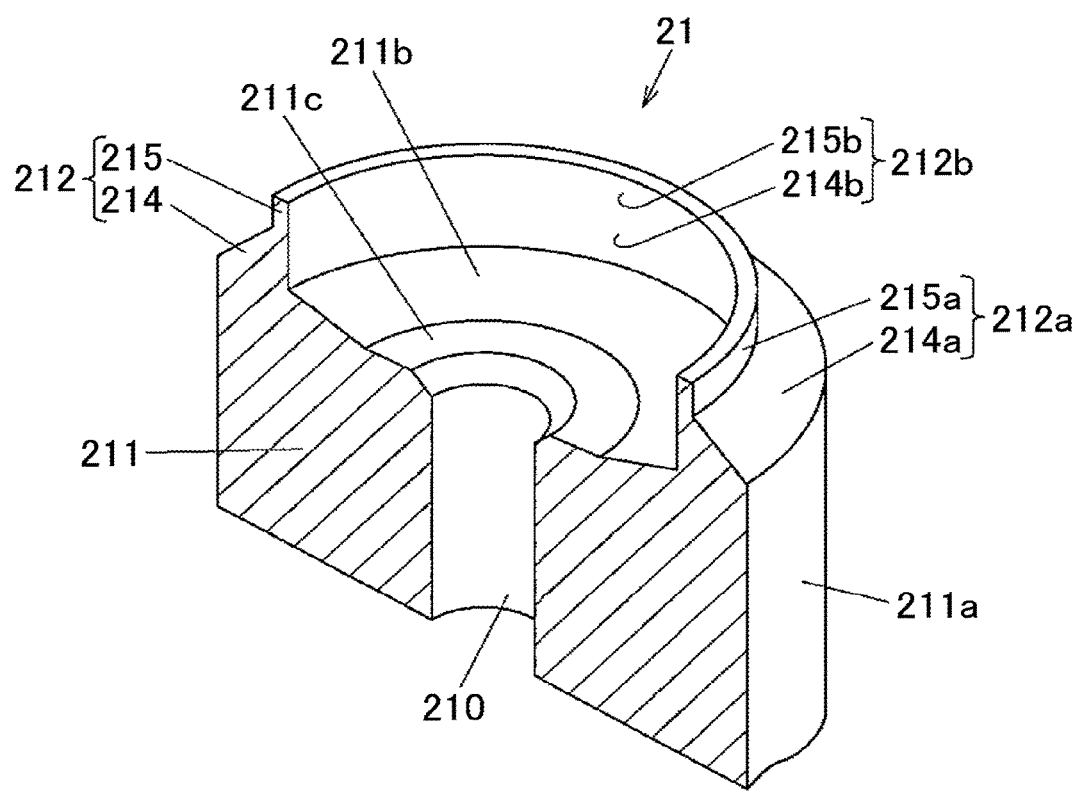
FIG. 3 is a sectional perspective view of a solenoid core.

FIG. 1 is a sectional view showing, together with a valve body, the configuration of a solenoid valve according to an embodiment of the present invention. FIG. 2A is an enlarged view of a solenoid part of the solenoid valve in a non-operating state, and FIG. 2B is an enlarged view of the solenoid part of the solenoid valve in an operating state. FIG. 3 is a sectional perspective view of a solenoid core.

A solenoid valve 1 includes a solenoid part 2, a tubular sleeve 3, a spool valve 4, and a restoring spring 10. The spool valve 4 is accommodated in the sleeve 3. The restoring spring 10 serves as a biasing member that biases the spool valve 4 toward the solenoid part 2. The solenoid part 2 operates when an exciting current is supplied thereto. The solenoid part 2 presses the spool valve 4 toward one side in the axial direction (toward the restoring spring 10) with a pressing force according to the magnitude of the exciting current. For example, the solenoid valve 1 is used as a fluid control valve that controls a hydraulic device of a vehicle automatic transmission.

As shown in FIG. 1, the solenoid valve 1 is used with the sleeve 3 fitted in a fitting hole 50 formed in a valve body 5. The valve body 5 has a supply passage 51, an output passage 52, and a feedback passage 53. The supply passage 51 is a passage through which hydraulic oil is supplied. The output passage 52 guides hydraulic oil to an object to be controlled (e.g., the hydraulic device of the vehicle automatic transmission). The feedback passage 53 communicates with the output passage 52. Hydraulic oil discharged from an oil pump, not shown, is supplied to the supply passage 51. The inner part of the fitting hole 50 serves as a drain passage 54 that guides hydraulic oil to a drain tank, not shown.

The sleeve 3 has a cylindrical body part 3a and a rib part 3b. The sleeve 3 is attached to a solenoid case 25 with the rib part 3b being in contact with a rib part 213 of a solenoid core 21 described below. The sleeve 3 has a valve hole 30 that accommodates the spool valve 4. As used herein, the axis O refers to the central axis of the valve hole 30, the axial direction refers to the direction parallel to the axis O, and the radial direction refers to the direction perpendicular to the axis O.

The spool valve 4 is accommodated in the valve hole 30 such that it can move in the axial direction in the valve hole 30. In FIG. 1, the portion above the axis O shows the solenoid valve 1 in a non-operating state (no exciting current being applied to an electromagnetic coil 20), and the portion below the axis O shows the solenoid valve in an operating state with an exciting current having a rated current value being applied to the electromagnetic coil 20 of the solenoid valve 1.

The body part 3a of the sleeve 3 has a supply port 31, an output port 32, a feedback port 33, and a drain port 34. The supply port 31 communicates with the supply passage 51, the output port 32 communicates with the output passage 52, the feedback port 33 communicates with the feedback passage 53, and the drain port 34 communicates with the drain passage 54. Hydraulic oil is supplied from the supply passage 51 to the supply port 31. Hydraulic oil is output from the output port 32 to the output passage 52. Hydraulic oil having passed through a restriction hole 331 is supplied into the feedback port 33. The drain port 34 communicates with the drain passage 54 through a groove, not shown, formed in an outer peripheral surface of the sleeve 3.

The body part 3a of the sleeve 3 has a first intermediate port 35 and a second intermediate port 36. The first intermediate port 35 is formed between the supply port 31 and the output port 32, and the second intermediate port 36 is formed between the output port 32 and the drain port 34.

The body part 3a of the sleeve 3 has a threaded part 3c. The threaded part 3c is formed in an inner surface of the opposite end of the body part 3a from the rib part 3b. One end of the valve hole 30 is closed by a plug body 300 that is screwed into the threaded part 3c. The restoring spring 10 is placed in a compressed state between the plug body 300 and an axial end face of the spool valve 4.

The valve hole 30 is formed by a first hole part 30a and a second hole part 30b. The first hole part 30a is located on the rib part 3b side of the feedback port 33, and the second hole part 30b is located on the plug body 300 side of the feedback port 33. The bore diameter of the second hole part 30b is larger than that of the first hole part 30a. The supply port 31, the output port 32, and the drain port 34 are arranged next to each other along the axis O and are open to the first hole part 30a.

The output port 32 has a strainer 6 fitted therein. The strainer 6 restrains foreign matter contained in hydraulic oil from flowing into the output port 32 through the output passage 52 when the hydraulic oil is discharged from the object to be controlled through the solenoid valve 1.

The spool valve 4 has first to fifth lands 41 to 45 located in this order in the direction from the rib part 3b toward the plug body 300. The second to fifth lands 42 to 45 have the same outside diameter, and the outside diameter of the second to fifth lands 42 to 45 is larger than that of the first land 41. An outer peripheral surface of the first land 41 is in sliding contact with an inner surface of the first hole part 30a, and outer peripheral surfaces of the second to fifth lands 42 to 45 are in sliding contact with an inner surface of the second hole part 30b.

The end face of the first land 41 on the rib part 3b side is in contact with a shaft 23 of the solenoid part 2. The first land 41 and the second land 42 are adjacent to each other along the axis O. The end face of the second land 42 on the first land 41 side has a larger area than the end face of the first land 41 on the second land 42 side. The first land 41 and the second land 42 generate a pressing force that presses the spool valve 4 toward the plug body 300, due to the difference between the pressure receiving areas of the first and second lands 41, 42 that receive a feedback pressure of hydraulic oil supplied to the feedback port 33.

The second land 42 changes the area of a flow path between the supply port 31 and the first intermediate port 35 according to axial movement of the spool valve 4. The third land 43 changes the area of a flow path between the first intermediate port 35 and the output port 32 according to the axial movement of the spool valve 4. The spool valve 4 thus changes the area of a flow path between the supply port 31 and the output port 32 according to the axial movement of the spool valve 4.

The fourth land 44 changes the area of a flow path between the output port 32 and the second intermediate port 36 according to the axial movement of the spool valve 4. The fifth land 45 changes the area of a flow path between the second intermediate port 36 and the drain port 34 according to the axial movement of the spool valve 4.

The pressure of hydraulic oil that is output from the output port 32 thus varies according to the axial movement of the spool valve 4.

The solenoid part 2 has the electromagnetic coil 20, the solenoid core 21, a cylindrical plunger 22, the shaft 23, a stopper 24, and the solenoid case 25. The electromagnetic coil 20 generates magnetic flux by an exciting current. The solenoid core 21 is a fixed core that serves as a magnetic path for the magnetic flux that is generated when the exciting current is applied to the electromagnetic coil 20. The plunger 22 moves in the axial direction with respect to the solenoid core 21 when subjected to the magnetic flux from the electromagnetic coil 20. The shaft 23 moves with the plunger 22 in the axial direction and presses the spool valve 4. The stopper 24 is a restricting member that is fitted on the shaft 23 to restrict the axial movement of the plunger 22. The solenoid case 25 has a bottomed cylindrical shape. The solenoid core 21, the plunger 22, and the solenoid case 25 are made of a magnetic material such as iron. The shaft 23 and the stopper 24 are made of a nonmagnetic material such as austenitic stainless steel or aluminum.

A tubular bobbin 200 is fitted in the solenoid case 25. The bobbin 200 is made of a resin and has the electromagnetic coil 20 wound therearound. A connector part 201 is formed integrally with the bobbin 200 via a joint part 202. The connector part 201 is exposed to the outside of the solenoid case 25 and contains a connector pin for external connection (not shown) connected to the electromagnetic coil 20.

The solenoid core 21 includes a cylindrical part 211 and an annular extended part 212. The cylindrical part 211 has an insertion hole 210 (see FIG. 3) formed through the center thereof so that the shaft 23 is inserted therethrough. The extended part 212 is extended in the axial direction from an outer peripheral end of the cylindrical part 211 toward the plunger 22. The solenoid core 21 further includes the rib part 213. The rib part 213 is formed integrally with the cylindrical part 211 so as to project outward from one end of the cylindrical part 211 on the sleeve 3 side.

An outer peripheral surface 211a of the cylindrical part 211 faces an inner peripheral surface of the bobbin 200. One axial end of the bobbin 200 abuts on the rib part 213. An axial end face of the cylindrical part 211 which is located radially inside the extended part 212 is formed by an opposing surface 211b and a contact surface 211c. The opposing surface 211b faces the plunger 22 in the axial direction, and the contact surface 211c is a surface that is contacted by the stopper 24. The contact surface 211c is a flat surface perpendicular to the axial direction. The stopper 24 surface-contacts the contact surface 211c when the plunger 22 moves toward the cylindrical part 211 of the solenoid core 21.

The opposing surface 211b of the cylindrical part 211 is a tilted surface (tapered surface) formed around the contact surface 211c such that the distance in the axial direction between the opposing surface 211b and an axial end face 22b of the plunger 22 decreases closer to the outer periphery of the opposing surface 211b (loser to the extended part 212). An inner peripheral end of the opposing surface 211b is located at the same axial position as the contact surface 211c. Namely, the inner peripheral end of the opposing surface 211b is continuous with the contact surface 211c with no stepped portion therebetween.

In the present embodiment, the entire opposing surface 211b formed around the contact surface 211c and facing the axial end face 22b of the plunger 22 is a tilted surface. However, the present invention is not limited to this. A part of the opposing surface 211b may be a tilted surface formed such that the distance in the axial direction between the part of the opposing surface 211b and the axial end face 22b of the plunger 22 decreases closer to the outer periphery of the opposing surface 211b. That is, at least a part of the opposing surface 211b of the cylindrical part 211 need only be located closer to the plunger 22 than the contact surface 211c is. In other words, in the cylindrical part 211, at least a part of the opposing surface 211b formed around the contact surface 211c and facing the plunger 22 need only protrude toward the plunger 22 more than the contact surface 211c.

As shown in the enlarged views of FIGS. 2A and 2B, at least a part of the extended part 212 is tapered such that the outside diameter of at least a part of an outer peripheral surface 212a of the extended part 212 decreases closer to a tip end of the extended part 212. An inner peripheral surface 212b of the extended part 212 faces an outer peripheral surface 22a of the plunger 22. More specifically, the extended part 212 is formed by a tapered part 214 and an annular extending part 215. The outside diameter of the tapered part 214 decreases as further away in the axial direction from the cylindrical part 211. The extending part 215 extends in the axial direction from a tip end of the tapered part 214. The radial thickness of the extending part 215 is constant, and the radial thickness of the tapered part 214 decreases from a base end of the tapered part 214 closer to the tip end of the tapered part 214. The base end of the tapered part 214 is the end of the tapered part 214 on the cylindrical part 211 side, and the tip end of the tapered part 214 is the end of the tapered part 214 on the extending part 215 side.

The outer peripheral surface 212a of the extended part 212 is formed by an outer peripheral surface 214a of the tapered part 214 and an outer peripheral surface 215a of the extending part 215. The inner peripheral surface 212b of the extended part 212 is formed by an inner peripheral surface 214b of the tapered part 214 and an inner peripheral surface 215b of the extending part 215. The tapered part 214 and the extending part 215 have the same bore diameter, and the bore diameter of the tapered part 214 and the bore diameter of the extending part 215 are constant in the axial direction. The inner peripheral surface of the extended part 212 is parallel to the axis O.

The solenoid case 25 has a cylindrical body part 251, a bottom part 252, a cylindrical projecting part 253, and a clinched part 254. The projecting part 253 projects from the bottom part 252 along the axis O. The clinched part 254 is formed in the opposite end of the body part 251 from the bottom part 252. The solenoid case 25 accommodates the electromagnetic coil 20 and a part of the bobbin 200 in the axial direction between the body part 251 and the projecting part 253. The clinched part 254 fixedly holds the rib part 3b of the sleeve 3 on the rib part 213 of the solenoid core 21. The solenoid core 21 is thus held stationary with respect to the sleeve 3 so that the solenoid core 21 cannot move in the axial direction and cannot rotate relative to the sleeve 3.

The plunger 22 has an insertion hole 220 formed through the center thereof and has the shaft 23 inserted though the insertion hole 220. The axial end face 22b of the plunger 22 which faces the cylindrical part 211 of the solenoid core 21 in the axial direction is a flat surface perpendicular to the axis O. The plunger 22 has an oil flow hole, not shown. The oil flow hole is a through hole extending through the plunger 22 in the axial direction between the axial end face 22b facing the cylindrical part 211 of the solenoid core 21 and an axial end face 22c facing the bottom part 252 of the solenoid case 25. This oil flow hole reduces resistance that is applied from hydraulic oil in the solenoid case 25 to the plunger 22 when the plunger 22 moves in the axial direction.

For example, the shaft 23 is press-fitted in the insertion hole 220 of the plunger 22 and is thus fixed to the plunger 22. The shaft 23 moves with the plunger 22 in the axial direction. A tip end 231 of the shaft 23 contacts the spool valve 4 by the biasing force of the restoring spring 10, and a rear end 232 of the shaft 23 faces the bottom part 252 of the solenoid case 25.

The plunger 22 is supported by a bearing bush 26 so that the plunger 22 can move in the axial direction. The bearing bush 26 is placed inside the projecting part 253 of the solenoid case 25. The shaft 23 is supported by a bearing bush 27 so that the shaft 23 can move in the axial direction. The bearing bush 27 is placed inside the cylindrical part 211 of the solenoid core 21.

The stopper 24 is interposed between the plunger 22 and the cylindrical part 211 of the solenoid core 21. The stopper 24 is in the shape of an annular plate having a constant axial thickness, having a central hole 240 formed through the center thereof, and the shaft 23 passes through the central hole 240. The stopper 24 is in contact with the axial end face 22b of the plunger 22 and, in this state, moves with the plunger 22 and the shaft 23 in the axial direction.

Operation of the solenoid valve 1 will be described below with reference to FIGS. 1, 2A, and 2B. In the following description, the original position refers to the axial position of the plunger 22 at the time the rear end 232 of the shaft 23 contacts the bottom part 252 of the solenoid case 25, and the amount of displacement of the plunger 22 refers to the distance by which the plunger 22 has been moved in the axial direction from the original position.

When the solenoid valve 1 is in the non-operating state where no exciting current is supplied to the electromagnetic coil 20, the shaft 23 is subjected to the biasing force of the restoring spring 10 via the spool valve 4, so that the rear end 232 of the shaft 23 contacts the bottom part 252 of the solenoid case 25. At this time, the supply port 31 communicates with the output port 32 via the first intermediate port 35, communication between the output port 32 and the second intermediate port 36 is cut off by the fourth land 44 of the spool valve 4, and communication between the second intermediate port 36 and the drain port 34 is cut off by the fifth land 45 of the spool valve 4.

FIG. 2A shows a main part of the solenoid part 2 in the non-operating state. In this state, at least the inner peripheral surface 215b of the extending part 215 out of the inner peripheral surface 212b of the extended part 212 of the solenoid core 21 faces the outer peripheral surface 22a of the plunger 22.

If an exciting current is supplied to the electromagnetic coil 20 and the solenoid valve 1 is switched from the non-operating state shown in FIG. 2A to the operating state, the plunger 22 is displaced toward the cylindrical part 211 of the solenoid core 21 by the magnetic force of the electromagnetic coil 20. FIG. 2B shows the plunger 22 displaced by the maximum amount with an exciting current having a rated current value being supplied to the electromagnetic coil 20. In this state, the stopper 24 is sandwiched between the axial end face 22b of the plunger 22 and the contact surface 211c of the cylindrical part 211 of the solenoid core 21, whereby further axial movement of the plunger 22 is restricted.

When the plunger 22 is displaced toward the cylindrical part 211 of the solenoid core 21 to the position shown in FIG. 2B, the shaft 23 moves the spool valve 4 in the axial direction against the biasing force of the restoring spring 10, so that the output port 32 communicates with the drain port 34 via the second intermediate port 36, communication between the supply port 31 and the first intermediate port 35 is cut off by the second land 42 of the spool valve 4, and communication between the first intermediate port 35 and the output port 32 is cut off by the third land 43.

In FIG. 2B, a main flow of magnetic flux $\phi$ generated when an exciting current is applied to the electromagnetic coil 20 is shown by dashed lines. The magnetic flux $\phi$ contains first magnetic flux $\phi_1$ and second magnetic flux $\phi_2$. The first magnetic flux $\phi_1$ flows into the plunger 22 through the inner peripheral surface 212b of the extended part 212 of the solenoid core 21, and the second magnetic flux $\phi_2$ flows into the plunger 22 through the opposing surface 211b of the cylindrical part 211 of the solenoid core 21.

Figure 6A:
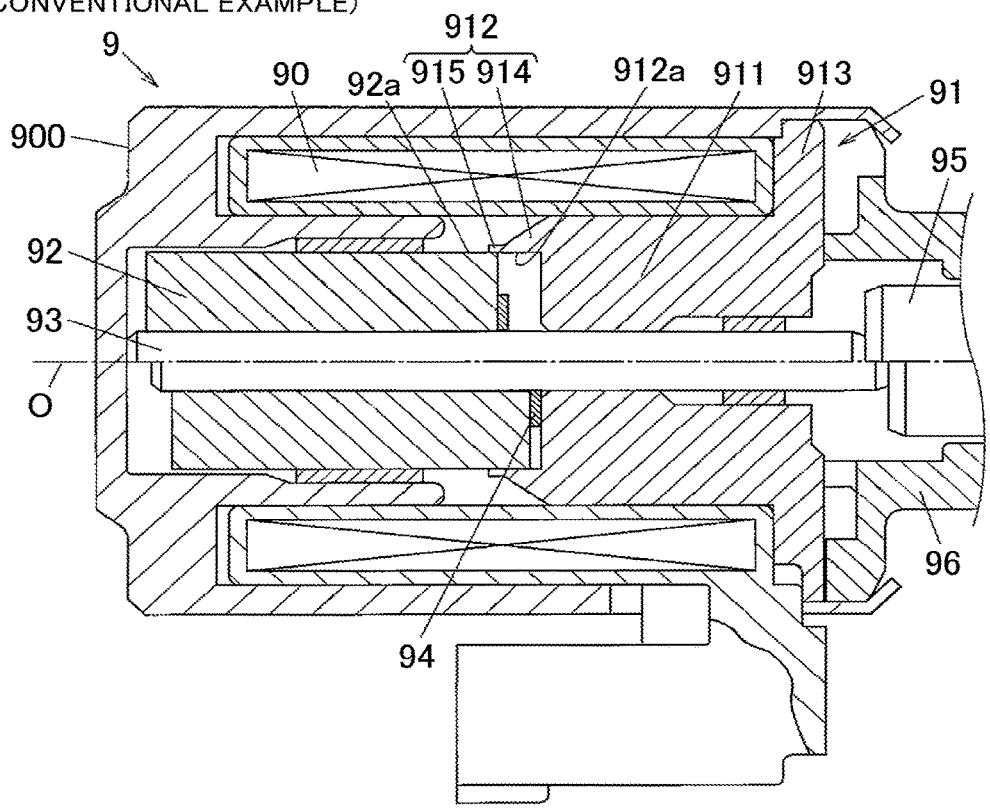
FIG. 6A is a sectional view of a solenoid part in an example of the configuration of a solenoid part in a conventional solenoid valve.
Figure 6B:
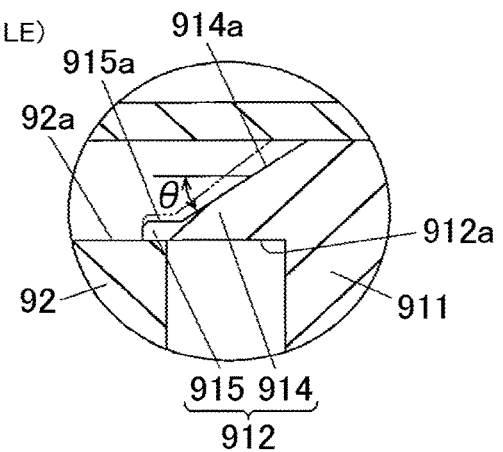
FIG. 6B is a partial enlarged view of FIG. 6A in the example of the configuration of the solenoid part in the conventional solenoid valve.

The opposing surface 211b of the cylindrical part 211 of the solenoid core 21 is a tilted surface (tapered surface) formed such that the distance in the axial direction between the opposing surface 211b and the axial end face 22b of the plunger 22 decreases closer to the outer periphery of the opposing surface 211b. Accordingly, the magnetic path for the second magnetic flux $\phi_2$ has lower magnetic resistance than in the conventional example shown in FIGS. 6A and 6B. Magnetic flux density of the second magnetic flux $\phi_2$ at the time the amount of displacement of the plunger 22 is close to its maximum value is higher than in this conventional example, and a larger axial force is thus applied to the plunger 22. When the amount of displacement of the plunger 22 is small, an axial force is applied to the plunger 22 mainly by the first magnetic flux $\phi_1$. As the amount of displacement of the plunger 22 increases, the proportion of a radial component in a force that is applied to the plunger 22 by the first magnetic flux $\phi_1$ increases, and this force does not contribute to the axial force that is applied to the plunger 22.

As shown in FIG. 2A, the axial interval g refers to an interval in the axial direction between inner and outer peripheral ends of the opposing surface 211b. The axial interval g is smaller than the thickness t of the stopper 24 (see FIG. 2B). Accordingly, when the stopper 24 contacts the contact surface 211c of the cylindrical part 211 of the solenoid core 21, the opposing surface 211b of the cylindrical part 211 does not contact the axial end face 22b of the plunger 22, and there is clearance S between the axial end face 22b of the plunger 22 and the opposing surface 211b. This clearance S restrains the plunger 22 from not being separated from the solenoid core 21 due to residual magnetism in the solenoid core 21 and the plunger 22 when an exciting current supplied to the electromagnetic coil 20 decreases.

The thickness t of the stopper 24 is e.g., 0.8 to 1.0 mm. The difference between the thickness t of the stopper 24 and the axial interval g between the inner and outer peripheral ends of the opposing surface 211b is, e.g., 0.1 mm or more. The upper limit of this difference is not particularly limited. However, it is desirable that the upper limit value of this difference be equal to or smaller than half the thickness t of the stopper 24. The axial interval g corresponds to the maximum value of the interval in the axial direction between the opposing surface 211b and the contact surface 211c of the cylindrical part 211 of the solenoid core 21.

Figure 4:
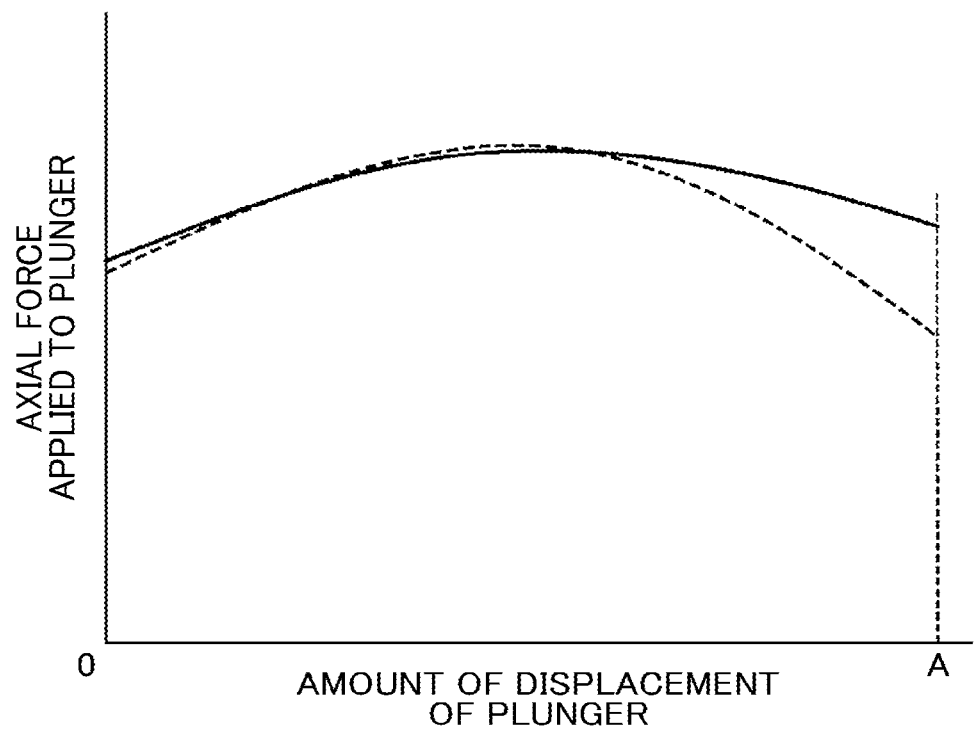
FIG. 4 is a graph showing how an axial force that is applied to a plunger changes according to the amount of displacement of the plunger in the case where a predetermined exciting current is supplied to an electromagnetic coil.

FIG. 4 is a graph showing how an axial force that is applied to the plunger 22 changes according to the amount of displacement of the plunger 22 in the case where a predetermined exciting current is supplied to the electromagnetic coil 20. In the graph of FIG. 4, the continuous line represents the relationship between the amount of displacement of the plunger 22 and the axial force in the solenoid valve 1 according to the present embodiment, and the dashed line represents the relationship between the amount of displacement of the plunger 92 and the axial force in the solenoid valve 9 of the conventional example described with reference to FIGS. 6A and 6B.

In the graph of FIG. 4, the left end of the abscissa shows the original position of the plunger 22 (amount of displacement: zero), and point A on the abscissa shows the position of the plunger 22 at the time the stopper 24 contacts the contact surface 211c of the cylindrical part 211 of the solenoid core 21. In the graph of FIG. 4, the value of the axial force that is applied to the plunger 22 increases upward along the ordinate.

As shown in FIG. 4, in the solenoid valve 1 of the present embodiment, the axial force that is applied to the plunger 22 is greatly increased particularly near the maximum value of the amount of displacement of the plunger 22, as compared to the solenoid valve 9 of the conventional example. This is because, in the solenoid valve 1 of the present embodiment, the magnetic flux density of the second magnetic flux $\phi_2$ increases as compared to the solenoid valve 9 of the conventional example when the plunger 22 approaches the cylindrical part 211 of the solenoid core 21. In the solenoid valve 1 of the present embodiment, the axial force that is applied to the plunger 22 is increased near the maximum value of the amount of displacement of the plunger 22. This restrains variation in axial force according to the amount of displacement of the plunger 22. Namely, the continuous line in the graph of FIG. 4 has a flatter profile.

The above embodiment can restrain reduction in axial force that is applied to the plunger 22 when the plunger 22 is located at the end, on the cylindrical part 211 side, of a movable range of the plunger 22 relative to the solenoid core 21, or a range in which the plunger 22 can move relative to the solenoid core 21. The above embodiment can thus restrain variation in axial force according to the axial position of the plunger 22.

The axial force that is applied to the plunger 22 when the plunger 22 is located near the cylindrical part 211 of the solenoid core 21 can be increased by the second magnetic flux $\phi_2$. Accordingly, for example, even if the axial force that is applied to the plunger 22 when the amount of displacement of the plunger 22 is small is increased by increasing the radial thickness of the extending part 215 in the extended part 212 of the solenoid core 21 and increasing the tilt angle θ (see FIG. 2A) of the outer peripheral surface 214a of the tapered part 214 with respect to the axial direction, the axial force that is applied to the plunger 22 when the amount of displacement of the plunger 22 is large is not significantly reduced. This can also restrain variation in axial force according to the axial position of the plunger 22.

According to the present embodiment, there is the clearance S between the opposing surface 211b of the cylindrical part 211 of the solenoid core 21 and the axial end face 22b of the plunger 22 even when the stopper 24 is sandwiched between the contact surface 211c of the cylindrical part 211 of the solenoid core 21 and the axial end face 22b of the plunger 22. This restrains the plunger 22 from not being separated from the solenoid core 21 due to the residual magnetism in the solenoid core 21 and the plunger 22.

According to the present embodiment, the opposing surface 211b of the cylindrical part 211 of the solenoid core 21 is a tilted surface formed such that the distance in the axial direction between the opposing surface 211b and the axial end face 22b of the plunger 22 decreases closer to the outer periphery of the opposing surface 211b. Accordingly, the opposing surface 211b can be easily formed by lathe turning. This restrains an increase in manufacturing cost as compared to, e.g., the solenoid valve 9 of the conventional example.

Other embodiments will be described below. FIG. 5A is a sectional view of a solenoid core 21A according to another embodiment which has a shape modified from the solenoid core 21 of the above embodiment. FIG. 5B is a sectional view of a solenoid core 21B according to still another embodiment which has a shape modified from the solenoid core 21 of the above embodiment. In FIGS. 5A and 5B, the same components as those of the solenoid core 21 of the embodiment described with reference to FIG. 1 etc. are denoted with the same reference characters and description thereof will be omitted.

The solenoid core 21 of the above embodiment is described with respect to the case where the opposing surface 211b of the cylindrical part 211 of the solenoid core 21 is a tilted surface formed such that the distance in the axial direction between the opposing surface 211b and the axial end face 22b of the plunger 22 decreases closer to the outer periphery of the opposing surface 211b. In the solenoid core 21A of FIG. 5A, however, the opposing surface 211b of the cylindrical part 211 is a flat surface that is located closer to the plunger 22 than the contact surface 211c and that is perpendicular to the central axis C of the insertion hole 210 in the solenoid core 21A.

In the solenoid core 21B of FIG. 5B, the opposing surface 211b of the cylindrical part 211 is formed by a flat surface $211b_1$ and a tilted surface $211b_2$. The flat surface $211b_1$ is located closer to the plunger 22 than the contact surface 211c. The tilted surface $211b_2$ is located between the contact surface 211c and the flat surface $211b_1$. The flat surface $211b_1$ is a flat surface perpendicular to the central axis C of the insertion hole 210 in the solenoid core 21B. The tiled surface $211b_2$ is formed such that the tilted surface $211b_2$ is located closer to the plunger 22 closer to the outer periphery of the tilted surface $211b_2$ and that the bore diameter of the tilted surface $211b_2$ increases closer to the outer periphery of the tilted surface $211b_2$.

Both the axial interval $g_1$ between the opposing surface 211b and the contact surface 211c of the cylindrical part 211 of the solenoid core 21A and the axial interval $g_2$ between the flat surface $211b_1$ and the contact surface 211c of the cylindrical part 211 of the solenoid core 21B are smaller than the thickness t of the stopper 24.

The solenoid cores 21A, 21B of these embodiments can also restrain reduction in axial force that is applied to the plunger 22 when the plunger 22 is located at the end, on the cylindrical part 211 side, of the movable range of the plunger 22 relative to the solenoid core 21A, 21B. The solenoid cores 21A, 21B can thus restrain variation in axial force according to the axial position of the plunger 22.

What is claimed is:

1. A solenoid valve, comprising:
a tubular sleeve having a supply port to which hydraulic oil is supplied and an output port that outputs hydraulic oil;
a spool valve that is accommodated in a valve hole formed in the sleeve such that the spool valve is movable in an axial direction in the valve hole, and that changes an area of a flow path between the supply port and the output port by axial movement of the spool valve;
a solenoid part that operates when an exciting current is supplied thereto and that presses the spool valve toward one side in the axial direction with a pressing force according to magnitude of the exciting current; and
a biasing member that biases the spool valve toward the solenoid part, wherein
the solenoid part includes
an electromagnetic coil that generates magnetic flux by the exciting current,
a fixed core that is held stationary with respect to the sleeve and that serves as a magnetic path for the magnetic flux,
a cylindrical plunger that moves in the axial direction with respect to the fixed core when subjected to the magnetic flux,
a shaft that moves with the plunger in the axial direction and presses the spool valve, and
a restricting member that is made of a nonmagnetic material and that is fitted on the shaft and is interposed between the plunger and the fixed core to restrict the axial movement of the plunger,
the fixed core includes
a cylindrical part that has an insertion hole formed through a center thereof so that the shaft is inserted through the insertion hole, and that has an opposing surface facing the plunger in the axial direction and a contact surface that is contacted by the restricting member, and
an annular extended part that is extended in the axial direction from an outer peripheral end of the cylindrical part toward the plunger, at least a part of the extended part being tapered such that an outside diameter of at least a part of an outer peripheral surface of the extended part decreases closer to a tip end of the extended part, and an inner peripheral surface of the extended part facing an outer peripheral surface of the plunger,
wherein a distance in the axial direction between the plunger and a part of the opposing surface of the cylindrical part, when the restricting member contacts the contact surface, is smaller than a distance in the axial direction between the plunger and the contact surface, and
wherein said part of the opposing surface extends over a majority of a length of the opposing surface in a radial direction,
wherein the part of the opposing surface of the cylindrical part of the fixed core is a tilted surface formed such that the distance in the axial direction between the part of the opposing surface and the axial end face of the plunger decreases progressively, closer to an outer periphery of the opposing surface.

2. The solenoid valve according to claim 1, wherein there is a clearance between an axial end face of the plunger and the opposing surface when the restricting member contacts the contact surface.

* * * * *